Figure 1:
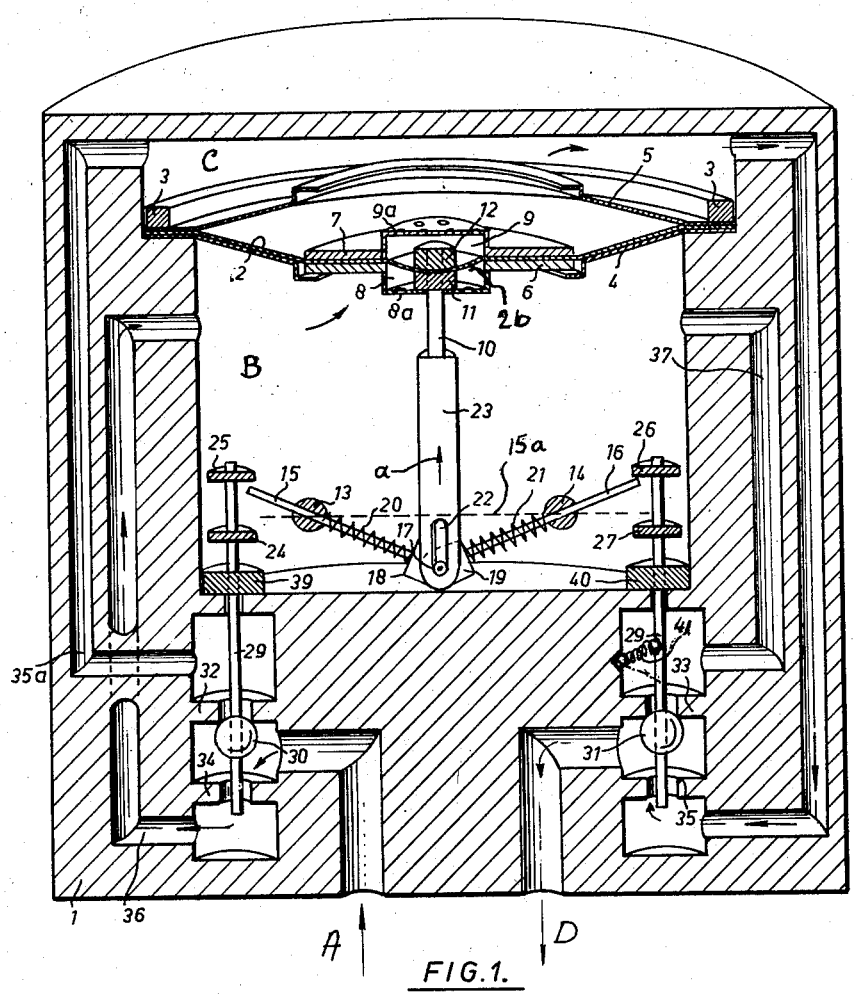

Jan. 20, 1959  H. PLATZER  2,869,515
FLUID METERING DEVICE
Filed Jan. 15, 1957  2 Sheets-Sheet 1

INVENTOR:
Hans PLATZER

By A. John Michel
Attorney

INVENTOR:
Hans PLATZER
By A. John Michel
Attorney

United States Patent Office 2,869,515
Patented Jan. 20, 1959

2,869,515

FLUID METERING DEVICE

Hans Platzer, Frankfurt am Main, Germany

Application January 15, 1957, Serial No. 634,213

Claims priority, application Germany January 17, 1956

15 Claims. (Cl. 121—48)

This invention relates to devices for measuring fluids of the type known as liquid or fluid meters. More particularly, the invention relates to change-over and valve reversing means which are used to rapidly reverse the position of the inlet and outlet regulating valves when a measured quantity of fluid has been discharged and the next quantity is being measured. The invention is applicable to fluid meters of the kind in which the change-over and valve reversing devices are connected to liquid displacing or evacuating elements, such as pistons, diaphragms, or the like, either by mechanical, electrical, or other suitable means. If diaphragms are used, their marginal zones must be firmly held by suitable retaining means to permit rapid movements of said diaphragms from one end position into the other whereby to interrupt the flow of fluid in one direction by reversing the position of the valves, and to thereby cause the fluid to act against the other side of the diaphragms until the latter return back into their first end position, and so forth.

Known devices of the aforesaid kind have a number of disadvantages, for instance, in that they require a considerable force for the reversal of valves. Their valves are comparatively slow to respond to the action of the change-over means and, in addition, the known devices are of complicated design and therefore costly to produce. Further disadvantages are lack of precision in operation and insufficient delivery. Accordingly, it is the main object of the invention to provide a fluid metering device of preferably but not necessarily diaphragm type, in which all these disadvantages are absent, which is of simple construction, efficient and reliable in operation, and convenient to handle.

A further object of the invention is to provide a device of the above described character in which the control means of the change-over and valve reversing means is temporarily separated from the measuring device proper but reassumes the control at the moment when the measured quantity of fluid is being expelled from the measuring chamber, or chambers, of the device in order to effect the change over and reversal of the position of the regulating valves.

With the above and other objects in view, the invention resides essentially in the provision of a fluid meter which, although making use of conventional diaphragms as liquid displacing or evacuating means, employs a different arrangement and operates in a different way. The fluid meter, for that purpose, is provided with at least two distinct diaphragms, of which one is active only to a point at which the reversal or change-over occurs, while the actual reversal is then carried out by the other diaphragm. In this way, inaccuracies in the amounts of measured fluid are avoided, since the first diaphragm may operate practically without play, the exact moment of reversal being determined by the second diaphragm.

A particular advantage of the arrangement just referred to resides in that the force which is required for the reversal is practically nil, so that the second diaphragm may be very small in comparison to the first diaphragm.

The invention, for the sake of simplicity and convenience, further provides that the diaphragm which is used for moving the reversing means into position of readiness for being tripped at the same time acts as measuring diaphragm, while the other diaphragm is merely used as a control member. The latter, being smaller than the former, is preferably concentrical with and disposed within the large diaphragm, and may be integral therewith. In the latter case, the additional advantage is that only one actuating or transmission member is required to transmit the movement from the diaphragms to the reversing or change-over device, for example, by mechanical or hydraulic means, or electrically over suitably arranged contact members.

Another advantage in accordance with the present invention is attainable by constructing the change-over or valve reversing device as a spring-lock forming part of a resilient toggle mechanism which allows movements of the measuring diaphragm or diaphragms into end position when the toggle mechanism is in or near its dead center or neutral position, whereupon the change-over movement, namely, the movement of the toggle mechanism beyond its dead center position, can be brought about by the control diaphragm with practically no effort.

In accordance with a modified form of the invention, one or more additional diaphragms parallel with the measuring diaphragm may be provided to partake in the measuring action. By this simple expedient of adding one or more diaphragms in one and the same measuring device, it is possible to multiply at will the working capacity of the fluid meter. The two, or more, measuring diaphragms may be installed in a common vessel to form three or more measuring chambers, or each of the cooperating diaphragms may be installed in a separate chamber if this is considered more convenient. If desired, all diaphragms may be connected to the reversing or change-over device in which case, however, special packings or other sealing and retaining means may become necessary. Another simpler and for that reason preferred procedure is to connect only one out of a plurality of cooperating measuring diaphragms with the change-over or reversing device.

It is, of course, advisable to use diaphragms of like diameters in order to obtain the most convenient arrangement of parts and a metering device of great simplicity. One of the additional diaphragms may be used as an adjusting member for calibrating the metering device as to the requisite unit quantity to be measured. In this case, the lift of the diaphragm can be changed by changing and adjusting the lateral contact surfaces of the diaphragm.

Figure 2:
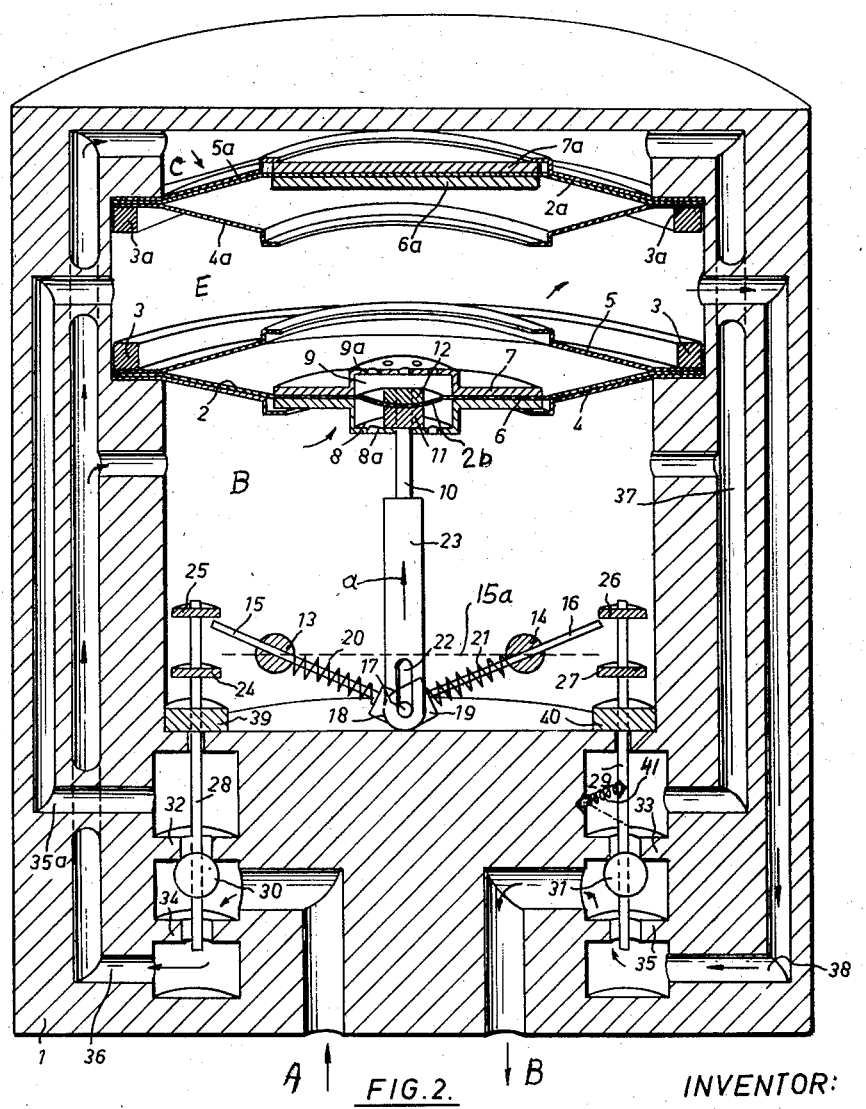

In the accompanying drawings, diagrammatically, illustrating by way of examples two embodiments of the invention, Fig. 1 is a longitudinal section through a metering device having one measuring and one control diaphragm, and Fig. 2 is a similar section through a device embodying an additional diaphragm.

The stroke or lift of measuring diaphragm 2 installed in the vessel or housing 1 of Fig. 1 is limited by the shells 4 and 5. Marginal portions of shells 4, 5 and of the diaphragm 2 are held tightly against a shoulder or seat in the housing 1 by a packing ring 3. Riveted or otherwise fixed to approximately the center of measuring diaphragm 2 are reinforcing plates 6 and 7 whose median portions are dished to form a small casing which is divided into two chambers 8 and 9 by a relatively small diaphragm $2b$ which may or may not be integral with the main or measuring diaphragm 2. The chambers 8 and 9 define two compartments provided with perforations 8a and 9a serving as inlet openings for the entry of a fluid to be measured. The bottom of chamber 8 is centrally drilled for the reception of a transmission member in the form of a sliding pin 10 which is adapted to reciprocate vertically in the chamber 8 and is provided with a collar 11, upon which the centrally perforated diaphragm 2b is adapted to rest. A nut or riveted plate 12 is provided at the upper end of pin 10 to hold members 2b, 10 and 11 tightly together. The collar 11 and the plate 12 are so dimensioned as to allow for a limited movement of the sliding pin 10 within the chambers 8 and 9 between the respective bottom and cover plates thereof. Thus, the collar 11 of sliding pin 10 may rest on the bottom of chamber 8 or the plate 12 may abut against the cover plate of chamber 9 when the pin 10 is in its uppermost position, after the diaphragm 2b has been rapidly displaced into its upper end position.

While the second diaphragm 2b has its own lifting capacity, the lift of both diaphragms is brought to effect by their common sliding pin 10. For the sake of clearness, the small diaphragm 2b will hereinafter be referred to as "control diaphragm" and the larger diaphragm 2 as the "measuring diaphragm."

Housing 1 supports in its enclosure b two rotatable shafts or rollers 13 and 14, each having a bore drilled therethrough at about the middle of its length. Guided in these drill holes are rods 15 and 16 whose inner ends are received in respective forked heads 18 and 19 in the center of the metering device, heads 18, 19 being rotatably united by a hinge pin 17. Compressed coil springs 20, 21 are disposed between members 13, 18, 14, 19, respectively. The ends of pin 17 are received in the slots 22 of a U-shaped bracket 23 whose upper end carries the aforedescribed sliding pin 10. By moving the pin 10 and the pin 17 in the direction of arrow a, the distance between supporting rods 13, 14 and the heads 18, 19 is reduced resulting in greater compression of springs 20, 21. As soon as pin 17 reaches the upper end of slot 22, pins 15, 16 and compressed springs 20, 21 assume the horizontal position which is indicated by the broken line 15a at the upper end of slot 22.

The spring- and spring-bar arrangement just described forms a toggle mechanism which connects, over the sliding pin 10 and the bracket 23, control diaphragm 2b directly and the measuring diaphragm 2 with a certain amount of play to the change-over or reversing device. The free ends of pins 15, 16 extend between the collars 24, 25 and 26, 27 of valve rods 28, 29, respectively. Ball valves 30, 31 are fixed to respective valve rods 28, 29.

Valve rod 29 is connected to the housing 1 by a snap-action mechanism 41 comprising a resilient element which is so installed that it at all times opposes reciprocating movements of member 29. In Fig. 1, ball valve 31 is in its uppermost position resting against the underside of seat 33, and the fluid is thus free to flow in passage 38 through the bore in valve seat 35 to be discharged at D from the housing 1. In the meantime, a certain pressure exists in enclosure B, this pressure being conveyed to the upper side of valve 31 through the connecting passage 37 and tending to displace the valve in downward direction. The purpose of snap-action mechanism 41 is to prevent downward movements of ball valve 31 together with its rod 29 under the influence of fluid pressure since any reversals in the position of said valve should be brought about only by the aforementioned toggle mechanism 15—21. The assembly 41 consists, in its simplest form, of two spherical members one of which is received in a suitable recess or cavity in valve rod 29 and the other in a similar recess provided in the housing 1. A compressed coil spring is disposed between and permanently acts against the two spherical members. In its position illustrated in Fig. 1, the coil spring of assembly 41 acts against the spherical member in valve rod 29 in such a way as to push the latter in upward direction whereby the ball valve 31 is tightly pressed against its upper seat 33 to prevent escape of fluid from enclosure B through the connecting passage 37. However, when the toggle mechanism 15—21 has displaced valve rod 29 in downward direction, i. e. when the valve member 31 rests against its lower seat 35, the coil spring of assembly 41 acts against the spherical member in valve rod 29 in such a way as to prevent the latter's movements in upward direction. This position of the assembly 41 is schematically illustrated in dot-dash lines. Ball valve 31 now resists pressures of fluid filling the enclosure C and the connecting passage 38.

No such snap-action means is necessary for the retention of valve rod 28 and valve 30 in their respective uppermost and lowermost positions since the pressure of fluid entering at A and flowing either into enclosure B via connecting passage 36 or into the enclosure C through the other passage 35a alone is sufficient to maintain the ball valve against its upper seat 32 or lower seat 34, respectively.

Packings 39 and 40 prevent leakage of fluid through the guide bores for the valve rods. Depending upon the position of the toggle mechanism, ball valves 30, 31 either rest against respective seats 32, 33 as shown, or against the seats 34, 35, respectively, to thus alternately open and close the passages 35a, 36, and 37, 38. In this manner, the fluid which flows into enclosure B through the passage 36 in the direction of arrows, impinges against the underside of and thereby displaces the measuring diaphragm 2 from one end position, as shown in Fig. 1, into the other end position (not shown) while at the same time displacing a measured amount of fluid which had previously entered enclosure C at the other side of diaphragm 2 and is now discharged through the passage 38.

The novel change-over or reversing device operates as follows:

It is assumed that the valves 30 and 31 are in their positions shown in the drawings, which correspond to the illustrated positions of toggle mechanism 15—21 and to the positions of measuring and control diaphragms 2, 2b, respectively. It is further assumed that the diaphragm 2 has just completed its downward stroke, while the valves 30, 31 have already been reversed into the positions shown to thereby allow the inflow of a fluid into the chamber B at the other, namely the underside of the diaphragm. The fluid enters the metering device at A in the direction of the arrow and passes through the passage 36 into the chamber or enclosure B below the diaphragm 2. As it gradually fills this chamber, it eventually contacts diaphragms 2 and 2b, thereby lifting the diaphragm 2 together with plates 6, 7, small casings 8, 9 as well as the transmission member or sliding pin 10 in upward direction. The small diaphragm 2b is raised bodily, that is without bending through because of the downwardly directed component of expanding force of the springs 20, 21 acting upon the sliding pin 10, and also because of its relatively small size in comparison with the size of measuring diaphragm 2, which does not permit the small diaphragm to snap into its other end position. Thus, during the uplift of the measuring diaphragm, control diaphragm 2b first remains in the position shown with the collar 11 kept in contact with the bottom of chamber 8 by the force of springs 20, 21 acting in downward direction on the sliding pin 10. However, the upward movement of the sliding pin also causes the U-shaped bracket to follow such upward movement, as indicated by the arrow a, and to cause composite pivoting and sliding movements of pins 15, 16. The springs are thereby further compressed until they finally assume a position, together with their pins 15, 16, which is indicated by the broken line 15a, in which their compression is at a maximum. The arrangement of just described transmission and change-over means is such that the position 15a is reached by the change-over means approximately at the same moment when the measuring diaphragm has moved into its upper end position while the position of control diaphragm with respect to diaphragm 2 remains unchanged.

Due to the movement of measuring diaphragm from its lower into its upper end position, the liquid which previously has been admitted into the chamber C above the diaphragm 2, is expelled through the passage 38 and leaves the metering device beneath the ball valve 31 at D as indicated by the arrows. The toggle mechanism being in its neutral or dead-center position 15a now needs only to be tripped in order to actuate the valves. This is brought about by the control diaphragm 2b owing to the pressure of fluid which enters the chamber 8 through openings 8a and moves the control diaphragm in upward direction causing the sliding pin 10 and the bracket 23 to join in the upward movement. The toggle mechanism is thus moved out of its neutral position 15a and rapidly assumes its other end position (not shown) whereby the free ends of pins 15, 16 act against the collars 24, 27 of respective valve rods 28, 29 to move the valves 30, 31 against respective seats 34, 35. The control diaphragm 2b has now assumed its upper end position in which the plate 12 rests against the cover plate of chamber 9. With the valve seats 32, 33 open and the seats 34, 35 closed, the fluid is now free to flow through the passage 35a into the enclosure C and the cycle is repeated in the opposing direction.

The movements of control diaphragm 2b between the bottom and cover of respective chambers 8 and 9 is preferably so dimensioned that the member 2b moves toggle mechanism 15—21 from its neutral position 15a at the very moment when the measuring diaphragm 2 has terminated its upward movement. The quantity of fluid displaced by the movement of control diaphragm 2b remains constant, so that the amount of fluid displaced by the measuring diaphragm together with the control diaphragm always corresponds to the amount which the metering device is intended to displace. In this manner, a high degree of accuracy is obtained which was not attainable with the metering devices of known design.

It is feasible, of course, to use other known or convenient types of change-over or reversing devices in lieu of the just described spring-actuated toggle mechanism, or the reversal may be effected by electric means over a suitably arranged contact which is moved into its position of release by the measuring diaphragm 2 and eventually operated by the control diaphragm to thereby reverse the position of valves substantially in the manner and for the purpose hereinbefore explained.

The modified metering device which is shown in Fig. 2 differs from the one just described in that an additional measuring diaphragm 2a is installed above the measuring diaphragm 2 in the same chamber therewith. Its lift is limited by shells 4a and 5a which are held against a suitable seat in the casing 1 by a common packing ring 3a. The median portion of diaphragm 2a is received between plates 6a and 7a whose travel is limited by respective shells 4a and 5a.

Metering of fluid is carried out in substantially the same manner as in the aforedescribed example, in that the fluid enters the metering device at A and flows through the passage 36 beneath the valve 30 into the chamber C above the diaphragm 2a. Since the latter diaphragm is not connected to the toggle mechanism and, therefore, is not influenced thereby, it will be the first to be moved into its other, namely, the lower end position, whereupon the measuring diaphragm 2 comes into action and lifts the toggle mechanism 15—21 into its neutral position 15a, from which it is eventually moved into its extreme upper position by the control diaphragm 2b in the same manner as in the embodiment of Fig. 1, so that the position of valves 30 and 31 is suddenly reversed to move the latter against respective seats 34 and 35. The fluid which, in the meantime, has been expelled by diaphragms 2, 2a leaves the enclosure E between the two measuring diaphragms, via the passage 38 to be discharged at D. The cycle is now repeated in the opposing direction whereby the fluid entering at A flows above the valve 30 through the passage 35a into the chamber E. The upper measuring diaphragm 2a again is the first to move into its upper end position shown in Fig. 2, whereupon diaphragm 2 follows in downward direction. The fluid expelled from the chambers B and C leaves the metering device through the passage 37, through the valve seat 33 and the outlet D.

To adjust the unit quantity of metered fluid either the additional diaphragm 2a may be used or a further small-diameter diaphragm with adjustable lift may be provided, its lift being adjustable, for example, by changing the position of inwardly directed edges of the shells 4a and 5a with which the plates 6 and 7 cooperate.

What I claim is:

1. A fluid metering device comprising, in combination: a measuring chamber, valve means for regulating the flow of a fluid into and out of said chamber, change-over means for reversing the position of said valve means, fluid displacing means in said chamber, including at least one measuring diaphragm adapted to be displaced by a fluid entering said chamber for moving the change-over means into a neutral position in advance of reversing the position of said valve means, and a control diaphragm connected with said measuring diaphragm for moving the change-over means from said neutral position, and transmission means connected with said diaphragms and with said change-over means for transmitting the movements of said diaphragms to the change-over means by first moving the latter into said neutral position while moving with said measuring diaphragm and for subsequently reversing the position of said valve means while moving with said control diaphragm.

2. A fluid metering device comprising, in combination: a measuring chamber, valve means for regulating the flow of a fluid into and out of said chamber, at least one measuring diaphragm in said chamber adapted to be displaced by a fluid entering said chamber, a control diaphragm connected with said measuring diaphragm, change-over means for said valve means, and transmission means connected with said change-over means and with said control diaphragm for reversing the position of said valve means upon displacement with said measuring diaphragm and while moving with said control diaphragm.

3. A fluid metering device comprising, in combination: a measuring chamber, reversible valve means for regulating the flow of a fluid into and out of said measuring chamber, a relatively large-diameter measuring diaphragm in said chamber, said diaphragm having two sides, a circular casing of relatively small diameter in the center of and at both sides of said diaphragm, a relatively small-diameter control diaphragm in said casing, said control diaphragm having two sides and dividing said casing into two compartments, one at each side thereof, each of said compartments having perforations in communication with said measuring chamber, a transmission member having one end fastened to said control diaphragm and slidably passing through one of said compartments, said member having a free end, and change-over means for reversing the position of said valve means comprising resilient means connected with the free end of said transmission member and operatively connected with said valve means for reversing the position of said valve means by snap action when displaced with said control diaphragm by the fluid entering through the opening in said casing after termination of the movement of said measuring diaphragm under the pressure of a fluid entering said chamber.

4. A fluid metering device comprising, in combination: a substantially cylindrical measuring chamber, reversible valve means for regulating the flow of a fluid into and out of said chamber, change-over means for reversing the position of said valve means, a measuring diaphragm in said chamber adapted to be displaced by a fluid entering said chamber, said diaphragm having two sides and being of a diameter approximating the diameter of said chamber and dividing the latter into two compartments, one at each side of said diaphragm, a control diaphragm connected with and having a diameter considerably smaller than the diameter of said measuring diaphragm, change-over means for said valve means in one of said compartments, a transmission member connected with said control diaphragm and with said change-over means, said change-over means comprising resilient means disposed between said transmission member and said valve means for reversing the position of said valve means upon displacement with said measuring diaphragm while moving with said transmission member and with said control diaphragm with respect to said measuring diaphragm.

5. A fluid metering device as set forth in claim 4, wherein said control diaphragm is integral with said measuring diaphragm, and further comprising plate means fastened to both sides of said measuring diaphragm about said control diaphragm.

6. A fluid metering device as set forth in claim 4, wherein said transmission member is rigidly connected with said control diaphragm and is resiliently connected with said measuring diaphragm.

7. A fluid metering device comprising, in combination: a substantially cylindrical measuring chamber, reversible valve means for regulating the flow of a fluid into and out of said chamber, change-over means for reversing the position of said valve means, a measuring diaphragm in said chamber having two sides and adapted to be displaced by a fluid entering said chamber, said diaphragm having a diameter approximating the diameter of said chamber, a control diaphrgam connected with and having a diameter smaller than the diameter of said measuring diaphragm, change-over means for reversing the position of said valve means, a sliding pin having one end directly connected with said control diaphragm, said pin having a free end and an elongated slot at said free end adjacent to said change-over means, said slot having two ends, said change-over means comprising spring-controlled arms extending toward said pin and hingedly mounted in and normally located at one end of said slot, said measuring and said control diaphragms being so installed that the lift of said measuring diaphragm under the pressure of a fluid entering said chamber and acting against one side of said measuring diaphragm displaces said spring-controlled arms into a neutral position and the subsequent lift of said control diaphragm causes said spring-controlled arms to snap into an end position for suddenly reversing the position of said valve means whereby to change the flow of a fluid to the other side of the diaphragms.

8. A fluid metering device as claimed in claim 7, wherein said change-over means for reversing said valve means constitutes a spring-controlled toggle mechanism.

9. A fluid metering device as claimed in claim 7, wherein said spring-controlled arms consist of oppositely directed spring pins, and further comprising compression springs on said spring pins and rotatable roller means mounted in said chamber for slidably guiding said spring pins in such a way that said springs become compressed during the movements of said sliding pins into said neutral position together with said measuring diaphragm and move said spring pins into an end position together with said control diaphragm.

10. A fluid metering device, comprising, in combination: a measuring chamber, reversible valve means for regulating the flow of a fluid into and out of said chamber, fluid evacuating means in said chamber comprising a first measuring diaphragm, a second measuring diaphragm for augmenting the performance of said first measuring diaphragm, and a control diaphragm connected with said first measuring diaphragm, slidable transmission means connected with said first measuring diaphragm and with said control diaphragm for transmitting the movements of said two last mentioned diaphragms, and change-over means operatively connected with said transmission means and with said valve means for reversing the position of said valve means, said change-over means comprising a toggle mechanism having a neutral position and two end positions, said toggle mechanism being so connected with said transmission means as to move into said neutral position when said transmission means is displaced by said first measuring diaphragm and into one of said end positions when said transmission means is displaced by said control diaphragm.

11. A fluid metering device as claimed in claim 10, further comprising at least one additional measuring diaphragm installed in said chamber, and parallel with said first measuring diaphragm.

12. A fluid metering device as claimed in claim 10, further comprising a plurality of additional measuring diaphragms installed in said chamber parallel with said first measuring diaphragm, each of said additional measuring diaphragms having a limited freedom of movement with respect to said first measuring diaphragm and said second measuring diaphragm when acted upon by a fluid entering said chamber.

13. A fluid metering device as claimed in claim 12, in which one of said additional diaphragms constitutes the adjusting diaphragm for varying the amounts of fluid metered by said device.

14. A fluid metering device as claimed in claim 12, in which one of said additional diaphragms constitutes the adjusting diaphragm having two contact surfaces, and further comprising means for so connecting said adjusting diaphragm with said device as to permit varying the positions of said contact surfaces with respect to the diaphragms in said chamber.

15. In a fluid metering device having a chamber, in combination: at least one measuring diaphragm in said chamber, a control diaphragm in said chamber connected to one measuring diaphragm, each measuring diaphragm and said control diaphragm having freedom of limited movement in said chamber and said control diaphragm having freedom of limited movement with respect to each measuring diaphragm, reversible valve means for controlling the flow of a fluid into and out of said chamber, and means so connected for movements with said control diaphragm as to reverse the position of said valve means when said control diaphragm performs movements with respect to the measuring diaphragm to which it is connected.

References Cited in the file of this patent

UNITED STATES PATENTS

| | | |
|---|---|---|
| 616,323 | Hedgeland | Dec. 20, 1898 |
| 1,067,613 | Lane | July 15, 1913 |
| 1,309,724 | Folberth | July 15, 1919 |
| 2,465,714 | Elliott | Mar. 29, 1949 |
| 2,590,275 | Ryder | Mar. 25, 1952 |